J. RAUSCH.
LAMP BRACKET.
APPLICATION FILED MAY 5, 1908.
915,216.
Patented Mar. 16, 1909.
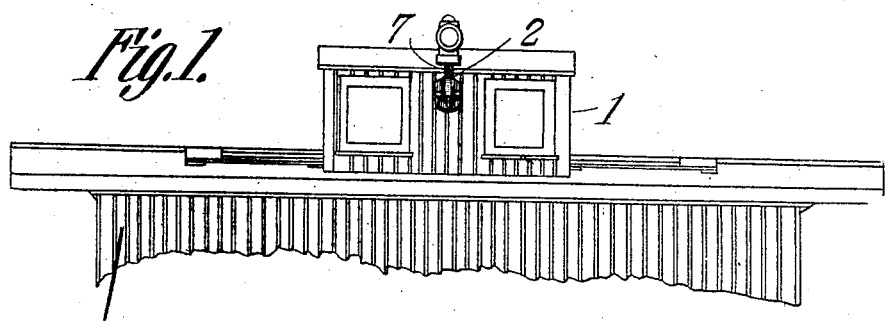
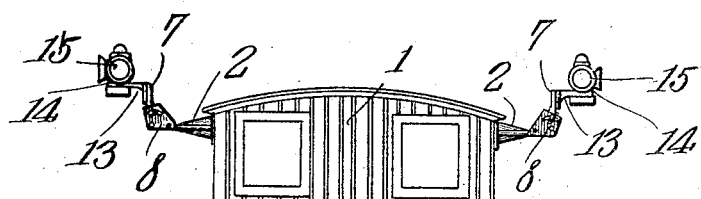
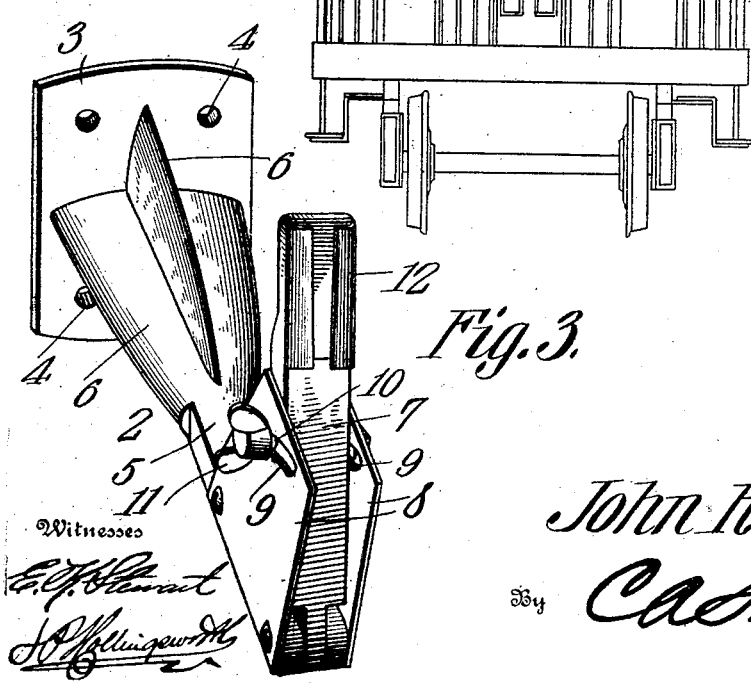
Inventor
John Rausch.

UNITED STATES PATENT OFFICE.

JOHN RAUSCH, OF HUNTINGTON, INDIANA.

LAMP-BRACKET.

No. 915,216.     Specification of Letters Patent.     Patented March 16, 1909.

Application filed May 5, 1908. Serial No. 431,033.

*To all whom it may concern:*

Be it known that I, JOHN RAUSCH, a citizen of the United States, residing at Huntington, in the county of Huntington and State of Indiana, have invented a new and useful Lamp-Bracket, of which the following is a specification.

This invention relates to lamp brackets; and has for its object to provide an efficient simple and strong lamp support having an arm pivotally attached thereto and carrying a socket at its free end in which to support a lantern. The bracket arm swings between cheek plates and is provided with means for securing it at any angle within its limit of movement.

The invention is primarily designed for attachment to the sides of the deck or lookout of caboose cars which are attached at the rear end of all freight trains for the use of the train men and for carrying such tools and implements as may be necessary to repair slight damages in the course of a run. By means of these brackets the deck lights are carried to or slightly past the sides of and above the roof of the caboose where they are continually in view of the engineer and fireman when they glance backward toward the rear of the train.

With this and other objects in view the invention consists of the novel construction, combination and arrangement of parts hereinafter described and claimed, and illustrated in the accompanying drawings in which:—

Figure 1 is a side view of the upper part of a caboose car with a bracket on the side of the lookout or deck; Fig. 2 an end view of the caboose showing a light bracket on each side of the lookout or deck and lamps therein, and Fig. 3 a perspective view of the lamp bracket detached.

Similar reference numerals are used for the same parts in all the figures.

In the drawing, the numeral 1 indicates the lookout or deck of a caboose car on each side of which near the roof is screwed or bolted a lantern bracket 2 of the improved type. Each bracket 2 comprises a base plate 3 having openings 4 for screws or bolts by means of which it is fastened to the side of the lookout 1. From the center of the base plate 3 projects a rigid arm 5, preferably integral therewith to, or slightly beyond, the side of the caboose car. The rigid arm 5 may be strengthened by a number of ribs 6 extending from the base plate 2 up the sides of the arm for about one half its length. Pivoted on the outer end of each rigid arm 5 is an upwardly extending vibrating arm 7 adapted to swing transversely of the car, between cheek plates 8 fastened to the rigid arm, and limited in its length of swing by curved slots 9 in said cheek plates through which slots and the swinging arm a headed bolt 10 passes, and by means of a hand nut 11 or other means the swinging arm is held at any desired angle. A lamp bracket socket 12 is screwed on the outer side of the swinging arm 7 at the top to support a lamp bracket 13 of well known form having a ring 14 in which is carried a tail lamp 15. Other varieties of lamps and different supporting means may be used on the swinging arm, the one illustrated being merely typical. As thus constructed and applied the light is always visible from the head of the train however long it may be; nor is it hidden by curves in the track or size of intervening cars, and as it can be seen over the top of the train the engineer is not compelled to lean out of the windows of the cab to assure himself that the train is intact. The lamps are easily and safely adjusted and, as by the use of these brackets two or more lamps may be dispensed with, the first cost and running expenses thereof are saved. These brackets carry the lamps in such position that they are not in danger when crossing bridges or passing through tunnels.

While the invention has been described in connection with a caboose car, it is applicable for use on cars of other kinds.

What is claimed is:—

1. A lamp bracket comprising a rigid arm having cheek-plates on its outer end and means on its inner end for rigidly fastening said arm to a support, a swinging arm pivoted to said rigid arm between said cheek plates to swing in a vertical plane and provided at its free end with a lamp socket, and means for locking said swinging arm to the fixed arm.

2. A lamp bracket comprising a rigid arm having a flat base plate at one end to be fixed to a support and a pair of parallel cheek plates at the other end provided each with a curved slot, a swinging arm pivoted to said rigid arm between said cheek plates to move in a vertical plane, a fastening means on said swinging arm extending through said curved slots to lock the swinging arm to said fixed arm, and a clamp for removably attaching a lamp thereto.

3. A lamp bracket comprising a rigid arm having a flat base plate at one end and a pair of parallel cheek plates at the other end projecting from one side of said arm and each provided with a curved slot, a swinging arm pivoted to the end of said fixed arm between said cheek plates, means on said swinging arm passing through said curved slots in the cheek plates to limit the extremes of movement of said arm and adapted to rigidly fasten the swinging arm to the fixed arm, and a socket on the outer end of said swinging arm for the attachment of a lamp.

4. A lamp bracket for railroad cars comprising a rigid arm having a flat base plate adapted to fasten to the side of the deck and extending horizontally to the side of said car the free end of said arm having a pair of parallel vertically disposed cheek plates, a swinging arm pivoted to the end of said fixed arm and extending upwardly between said cheek plates above the deck and provided with a lamp socket on its upper end, and means extending through said swinging arm and a concentric slot in each cheek plate for limiting the vibratory movement of said arm and adapted to rigidly fasten said swinging arm in various angular positions with respect to the fixed arm.

In testimony that I claim the foregoing as my own, I have hereto affixed my signature in the presence of two witnesses.

JOHN RAUSCH.

Witnesses:
C. H. CUTSHALL,
DANIEL L. SHAEFF.